(12) United States Patent
Toyooka et al.

(10) Patent No.: US 8,872,763 B2
(45) Date of Patent: Oct. 28, 2014

(54) POSITION DETECTING SYSTEM AND POSITION DETECTING METHOD

(75) Inventors: Takashi Toyooka, Nagano-ken (JP);
Tetsuro Yamazaki, Nagano-ken (JP);
Kazuhisa Mizusako, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 185 days.

(21) Appl. No.: 13/351,150

(22) Filed: Jan. 16, 2012

(65) Prior Publication Data
US 2012/0182214 A1 Jul. 19, 2012

(30) Foreign Application Priority Data

Jan. 19, 2011 (JP) ................. 2011-008682
Nov. 17, 2011 (JP) ................. 2011-251545

(51) Int. Cl.
*G06G 5/00* (2006.01)
*G06F 3/033* (2013.01)

(52) U.S. Cl.
USPC ......................... 345/156; 345/157

(58) Field of Classification Search
USPC .......................... 345/157, 158, 175
See application file for complete search history.

(56) References Cited

U.S. PATENT DOCUMENTS

| | | | | |
|---|---|---|---|---|
| 5,235,363 A | * | 8/1993 | Vogeley et al. | 353/122 |
| 7,421,111 B2 | * | 9/2008 | Dietz et al. | 382/154 |
| 8,411,053 B2 | * | 4/2013 | Doubrava et al. | 345/173 |
| 2001/0028342 A1 | * | 10/2001 | Notagashira | 345/157 |
| 2009/0140980 A1 | * | 6/2009 | Morimoto et al. | 345/158 |

FOREIGN PATENT DOCUMENTS

JP 2010-113598 A 5/2010

* cited by examiner

*Primary Examiner* — Kent Chang
*Assistant Examiner* — Mark Edwards

(57) ABSTRACT

A position detecting system includes an indicating device including a photodiode that detects timing of a light pulse and a transmission unit that transmits a signal representing the timing, a plurality of light sources that emit light pulses to areas acquired by dividing a screen into a plurality of parts at timings unique to the light sources, a reception unit that receives the signal representing the timing, and a control unit that detects a position of the indicating device based on the signal representing the timing.

18 Claims, 17 Drawing Sheets

POSITION DETECTING SYSTEM AND POSITION DETECTING METHOD

CROSS-REFERENCE TO RELATED APPLICATIONS

The entire disclosure of Japanese Patent Application Nos. 2011-008682, filed Jan. 19, 2011 and 2011-251545, filed Nov. 17, 2011 are expressly incorporated by reference herein.

BACKGROUND

1. Technical Field

The present invention relates to a position detecting system and a position detecting method that use an image display device.

2. Related Art

An input system is disclosed in JP-A-2010-113598, which detects the position of an indicating device (electronic pen) indicating an arbitrary point in an image projected onto a screen from a projector and displays an image according to the position. The input system disclosed in JP-A-2010-113598 can display an image according to the position of the indicating device without using a special screen by performing a calibration process of the indicating device in advance. However, a predetermined time is required for the calibration process of the indicating device. Accordingly, there is a problem in that, even when a position detecting system (input system) is installed, a user cannot use the position detecting system until the calibration process of the indicating device is completed.

SUMMARY

An advantage of some aspects of the invention is that it provides a position detecting system and a position detecting method that use an image display device capable of displaying an image according to the position of an indicating device without using a special screen or performing a calibration process of the indicating device.

An aspect of the invention is directed to a position detecting system including: an indicating device that includes a sensor that receives a light pulse and detects timing of the light pulse and a transmission unit that transmits a signal representing the timing; a plurality of light sources that emit light pulses to areas acquired by dividing a screen into a plurality of parts at timings unique to the light sources; a reception unit that receives the signal representing the timing from the transmission unit; and a control unit that detects a position of the indicating device on the screen on which an image is displayed based on the signal representing the timing.

According to the above-described configuration, since the position of the indicating device on the screen is detected based on the timing of the light pulse, the position detecting system can display an image according to the position of the indicating device (interactive operation) without using a special screen or performing a calibration process of the indicating device.

Another aspect of the invention is directed to the above-described position detecting system, which further includes a plurality of image display devices that include the light sources and a control device that includes the reception unit and the control unit.

In this configuration, since the position of the indicating device on the screen is detected based on the timing of the light pulse, the position detecting system can display an image according to the position of the indicating device (interactive operation) without using a special screen or performing a calibration process of the indicating device.

Still another aspect of the invention is directed to the above-described position detecting system, which further includes an image display device that includes the reception unit, the plurality of light sources, and the control unit.

In this configuration, since the position of the indicating device on the screen is detected based on the timing of the light pulse, the position detecting system can display an image according to the position of the indicating device (interactive operation) without using a special screen or performing a calibration process of the indicating device.

Yet another aspect of the invention is directed to the above-described position detecting system, wherein each light source emits a light pulse at a timing unique to the light source to the area corresponding to the light source and areas adjacent to the area, and the control unit detects the position of the indicating device based on timings of a plurality of the light pulses of one light source and one or more light sources adjacent to the one light source.

In this configuration, since the position of the indicating device on the screen is detected based on the timings of a plurality of light pulses of the one light source and one or more light sources adjacent to the one light source, the position detecting system can display an image according to the position of the indicating device.

Still yet another aspect of the invention is directed to the above-described position detecting system, wherein the control unit detects the position of the indicating device based on ratios between intensities of the light pulses emitted from the plurality of light sources that are adjacent to each other.

In this configuration, since the position of the indicating device is detected based on the ratios between intensities of the light pulses emitted from the plurality of light sources that are adjacent to each other, the position detecting system can display an image according to the position of the indicating device.

Further another aspect of the invention is directed to the above-described position detecting system, wherein the control unit detects the position of the indicating device based on an interval between a first pulse emitted from each one of the plurality of light sources and a second pulse following the first pulse.

In this configuration, since the position of the indicating device is detected based on the interval between a first pulse emitted from each one of the plurality of light sources and a second pulse following the first pulse, the position detecting system can display an image according to the position of the indicating device.

Still further another aspect of the invention is directed to a position detecting system including: an indicating device that includes a sensor that receives a light pulse and detects timing of the light pulse, a control unit that detects a position of a device, to which the control unit belongs, on a screen on which an image is displayed based on the timing, and a transmission unit that transmits a signal representing the position; a reception unit that receives the signal representing the position from the transmission unit; and a plurality of light sources that emit light pulses to areas acquired by dividing the screen into a plurality of parts at timings unique to the light sources.

According to the above-described configuration, since the position of the indicating device on the screen is detected based on the timing of the light pulse, the position detecting system can display an image according to the position of the indicating device (interactive operation) without using a special screen or performing a calibration process of the indicating device.

Yet further another aspect of the invention is directed to the above-described position detecting system, which further includes a plurality of image display devices that include the light sources and a control device that includes the reception unit.

In this configuration, since the position of the indicating device on the screen is detected based on the timing of the light pulse, the position detecting system can display an image according to the position of the indicating device (interactive operation) without using a special screen or performing a calibration process of the indicating device.

Still yet further another aspect of the invention is directed to the above-described position detecting system, which further includes an image display device that includes the reception unit and the plurality of light sources.

In this configuration, since the position of the indicating device on the screen is detected based on the timing of the light pulse, the position detecting system can display an image according to the position of the indicating device (interactive operation) without using a special screen or performing a calibration process of the indicating device.

A further aspect of the invention is directed to the above-described position detecting system, which further includes a plurality of the indicating devices.

In this configuration, the position detecting system can display an image according to the positions of the plurality of indicating devices (implementation of multiple touches).

A still further aspect of the invention is directed to a method of detecting a position used in a position detecting system. The method includes: receiving a light pulse and detecting timing of the light pulse using a sensor included in an indicating device; transmitting a signal representing the timing by using a transmission unit included in the indicating device; emitting the light pulses at timings unique to light sources to areas acquired by dividing a screen into a plurality of parts by using a plurality of the light sources; receiving the signal representing the timing from the transmission unit by using a reception unit; and detecting a position of the indicating device on the screen on which an image is displayed based on the signal representing the timing by using a control unit.

According to the above-described method, since the position of the indicating device on the screen is detected based on the timing of the light pulse, the position detecting system can display an image according to the position of the indicating device without using a special screen or performing a calibration process of the indicating device.

A still yet further aspect of the invention is directed to the above-described method, wherein light sources included in a plurality of image display devices as the plurality of light sources, a reception unit that is included in the control device as the reception unit, and a control unit that is included in a control device as the control unit are used.

In this configuration, since the position of the indicating device on the screen is detected based on the timing of the light pulse, the position detecting system can display an image according to the position of the indicating device without using a special screen or performing a calibration process of the indicating device.

A furthermore aspect of the invention is directed to the above-described method, wherein a reception unit included in an image display device as the reception unit, a plurality of light sources included in the image display device as the plurality of light sources, and a control unit that is included in the image display device as the control unit are used.

In this configuration, since the position of the indicating device on the screen is detected based on the timing of the light pulse, the position detecting system can display an image according to the position of the indicating device without using a special screen or performing a calibration process of the indicating device.

According to the aspects of the invention, since the position of the indicating device on the screen is detected based on the timing of the light pulse, the position detecting system can display an image according to the position of the indicating device without using a special screen or performing a calibration process of the indicating device.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of the invention will be described in detail with reference to the drawings. In a position detecting system, an indicating device receives a light pulse on a screen and transmits a signal that represents the timing of the received light pulse. In addition, a position detecting device receives the signal that represents the timing of the light pulse and detects the position of the indicating device on the screen based on the received signal. The image display device displays an image according to the detected position of the indicating device.

Figure 1:
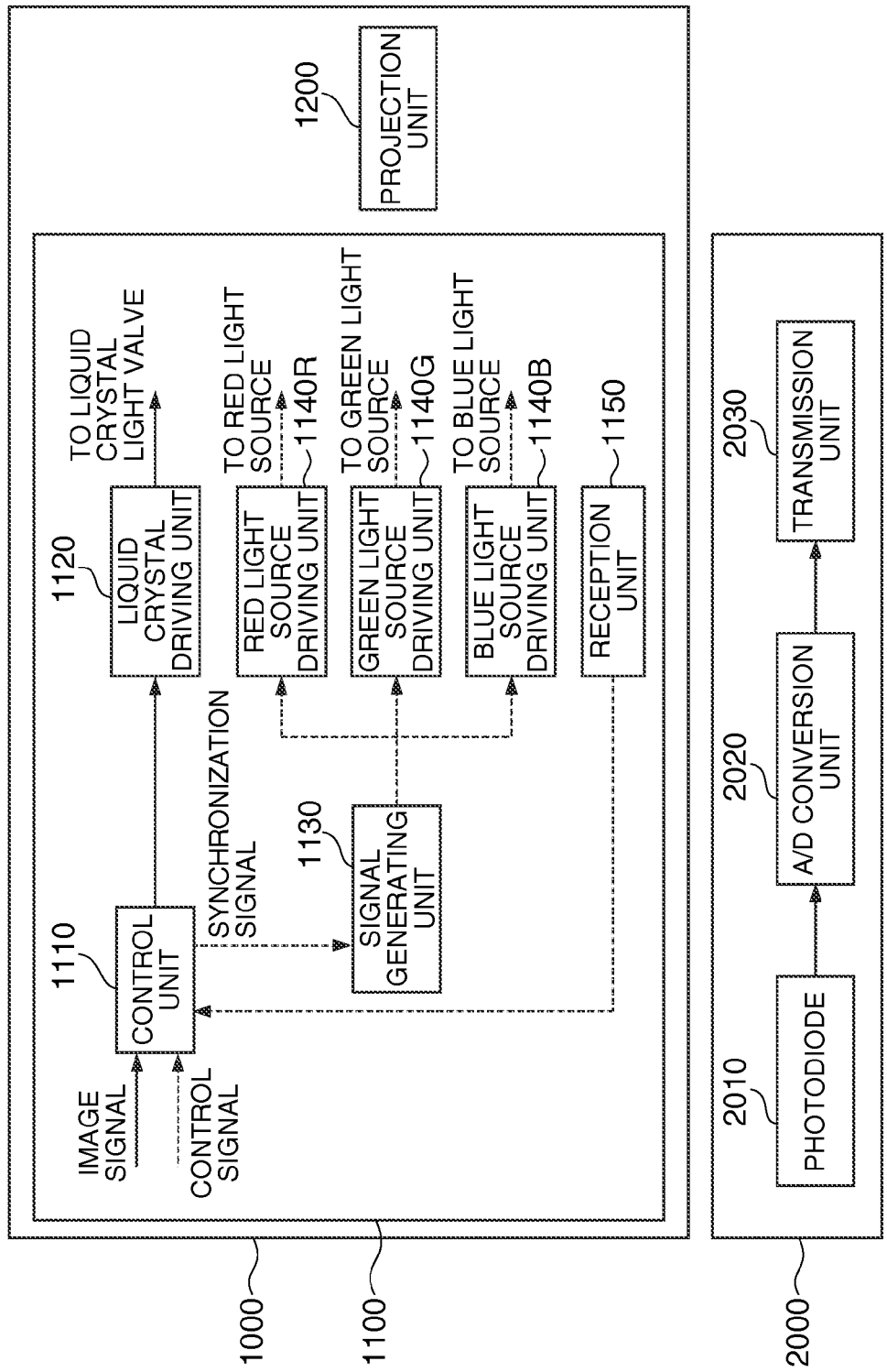
FIG. 1 is a diagram showing the configuration of a position detecting system according to a first embodiment of the invention.

FIG. 1 shows the configuration of the position detecting system. The position detecting system includes an image display device 1000 and an indicating device 2000. The indicating device 2000 is a pointing device (for example, an electronic pen) that is used for indicating the position on the screen. The indicating device 2000 includes a photodiode 2010, an A/D conversion unit 2020, and a transmission unit 2030.

The photodiode 2010 receives a light pulse and detects the intensity of the received light pulse. The A/D conversion unit 2020 outputs a digital signal that represents the timing of the light pulse detected by the photodiode 2010. Here, for example, the timing of the light pulse is detected based on a difference in the voltage according to the amount of received light.

The transmission unit 2030 transmits a signal that represents the timing of a light pulse. Here, a plurality of the indicating devices 2000 may be included in the position detecting system (implementation of a multi-touch). In such a case, the transmission unit 2030 transmits an identification number that is used for identifying each indicating device.

The image display device 1000 includes a position detecting device 1100 and a projection unit 1200. The position detecting device 1100 includes a control unit 1110, a liquid crystal driving unit 1120, a signal generating unit 1130, a red light source driving unit 1140R, a green light source driving unit 1140G, a blue light source driving unit 1140B, and a reception unit 1150.

The reception unit 1150 receives a signal that represents the timing of a light pulse from the transmission unit 2030 of the indicating device 2000 and transmits the signal to the control unit 1110. In a case where a plurality of the indicating devices 2000 are included in the position detecting system, the reception unit 1150 transmits a signal that represents the timing of a light pulse to the control unit 1110 for each received identification number.

Figure 2:
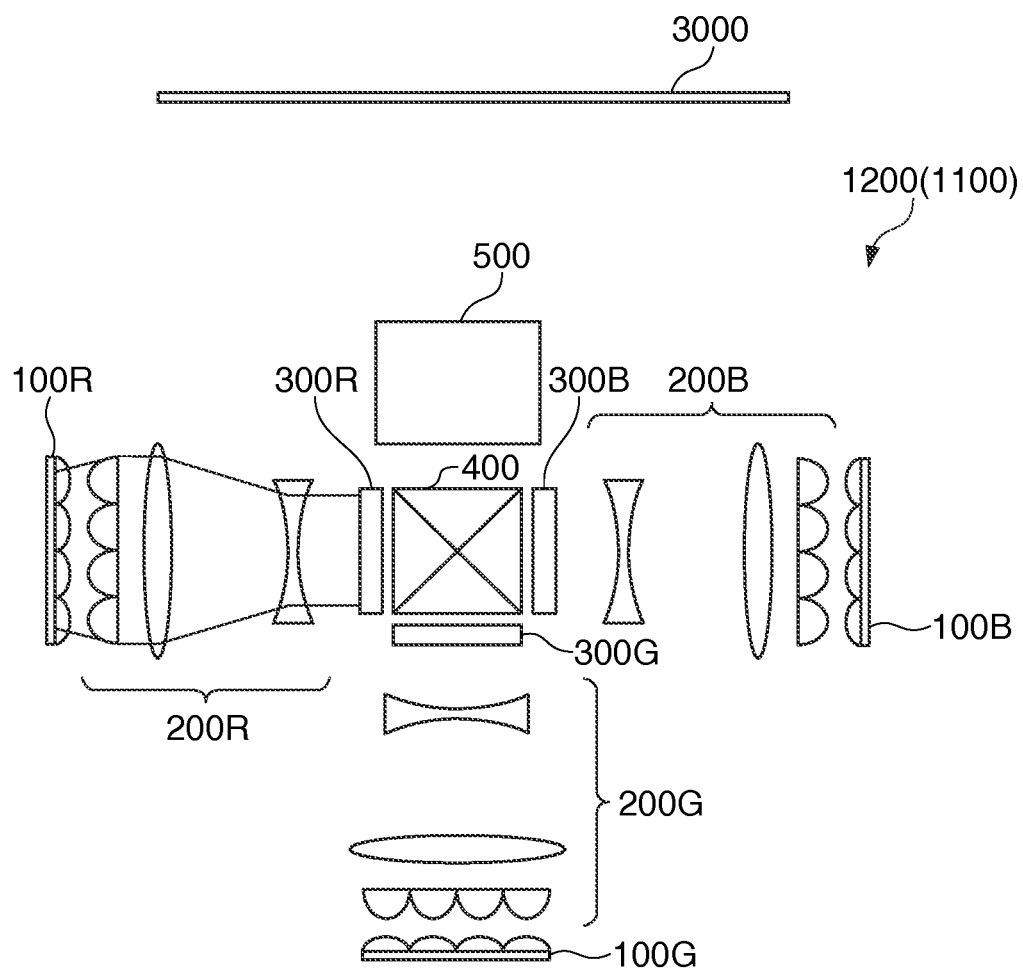
FIG. 2 is a diagram showing the configuration of a projection unit according to the first embodiment of the invention.

FIG. 2 shows the configuration of the projection unit. The projection unit 1200 includes a cross-dichroic prism 400 and a projection optical system 500. In addition, the projection unit 1200 includes a red light source unit (R-LED array) 100R, a red light collimator optical system 200R, and a red light liquid crystal light valve 300R. Furthermore, the projection unit 1200 includes a green light source unit (G-LED array) 100G, a green light collimator optical system 200G, and a green light liquid crystal light valve 300G. In addition, the projection unit 1200 includes a blue light source unit (B-LED array) 100B, a blue light collimator optical system 200B, and a blue light liquid crystal light valve 300B. Furthermore, each light source unit may be included not in the projection unit 1200 but in the position detecting device 1100.

Figure 3:
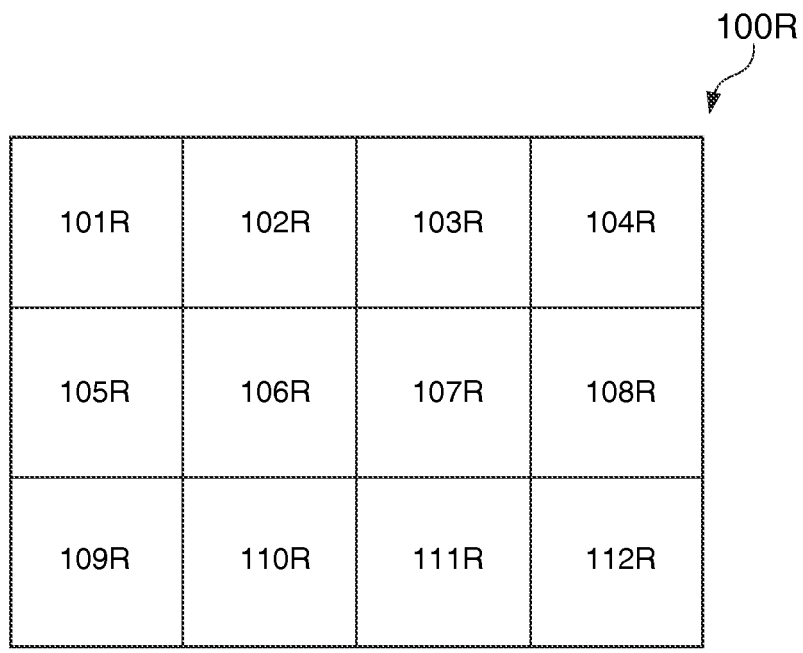
FIG. 3 is a diagram showing the configuration of a red light source unit according to the first embodiment of the invention.

FIG. 3 shows the configuration of the red light source unit. Red light sources 101R to 112R, for example, are LEDs (Light Emitting Diodes) and project red light LR. Each light source emits a light pulse at a timing that is unique to the light source to an area corresponding to the light source and areas adjacent to the area out of areas acquired by dividing the screen 3000 into a plurality of areas (to be described later with reference to FIGS. 5 and 6).

The red light sources 101R to 112R are arranged in a shape that is similar to the red light liquid crystal light valve 300R (see FIG. 2). In the example shown in FIG. 3, the red light sources 101R to 112R are arranged in three rows and four columns. In addition, the green light source unit 100G and the blue light source unit 100B have the same shape as that of the red light source unit 100R.

Referring back to FIG. 2, the description of the configuration of the projection unit will be continued. The red light collimator optical system 200R includes a plurality of lenses and uniformizes the illumination distribution of the red light LR projected by the red light source unit 100R in the red light liquid crystal light valve 300R. The green light collimator optical system 200G and the blue light collimator optical system 200B have configurations and functions similar thereto.

The red light liquid crystal light valve 300R, the green light liquid crystal light valve 300G, and the blue light liquid crystal light valve 300B are optical modulation devices. The red light LR modulated by the red light liquid crystal light valve 300R is incident to the cross-dichroic prism 400. In addition, the green light LG modulated by the green light liquid crystal light valve 300G is incident to the cross-dichroic prism 400 in a direction different from the direction of the red light LR. Furthermore, the blue light LB modulated by the blue light liquid crystal light valve 300B is incident to the cross-dichroic prism 400 in a direction different from the directions of the red light LR and the green light LG.

The cross-dichroic prism 400 has a structure formed by bonding rectangular prisms, and, on the inner face of the structure, a mirror surface reflecting the red light LR and a mirror surface reflecting the blue light LB are formed in a cross shape. The red light LR, the green light LG, and the blue light LB pass through the mirror surfaces so as to be composed. The composed light forms an image.

The projection optical system 500 includes a projection lens. The image formed by the cross-dichroic prism 400 is projected onto the screen 3000 in an enlarged scale by the projection lens. Accordingly, the projection unit 1200 projects an image onto the screen 3000 (screen) by using the emission of each light source unit.

Referring back to FIG. 1, the description of the configuration of the position detecting system will be continued. An image signal and a control signal are input to the control unit 1110. The control unit 1110 performs predetermined signal processing for the image signal based on the control signal. The control unit 1110, for example, is a DSP (Digital Signal Processor). In addition, the control unit 1110 outputs a synchronization signal that is synchronized with the display timing of an image to the signal generating unit 1130. Here, the synchronization signal, for example, is a vertical synchronization signal (Vsync).

A signal representing the timing of a light pulse is input to the control unit 1110 from the reception unit 1150. In addition, in a case where a plurality of the indicating devices 2000 are included in the position detecting system, an identification number used for identifying each indicating device is input to the control unit 1110 from the reception unit 1150. The control unit 1110 detects the position on the screen, which is indicated by the indicating device 2000, based on the signal representing the timing of a light pulse. Here, the control unit 1110 detects the indicated position based on the timings of one light source and one or more light sources adjacent thereto. A method of detecting the indicated position will be described later with reference to FIGS. 4 and 9 to 11.

The control unit 1110 outputs an image signal that represents an image (interactive image) corresponding to the indicated position to the liquid crystal driving unit 1120. For example, the control unit 1110 outputs an image signal that represents an image overlapped by a cursor at the indicated position to the liquid crystal driving unit 1120 so as to display the cursor at the indicated position.

The liquid crystal driving unit (optical modulation device driving unit) 1120 drives each liquid crystal light valve (optical modulation device) (see FIG. 2) in accordance with the image signal that represents an image corresponding to the indicated position. The signal generating unit 1130 controls the red light source driving unit 1140R, the green light source driving unit 1140G, and the blue light source driving unit 1140B in synchronization with the synchronization signal.

The red light source driving unit 1140R drives the red light source unit 100R under the control of the signal generating unit 1130. Here, the red light source driving unit 1140R emits light pulses of which timings are unique to each of the red light sources 101R to 112R (see FIG. 3) to areas on the screen 3000, which correspond to the light sources, individually from the light sources. The green light source driving unit 1140G and the blue light source driving unit 1140B operate similarly.

Next, the light pulse will be described.

Figure 4:
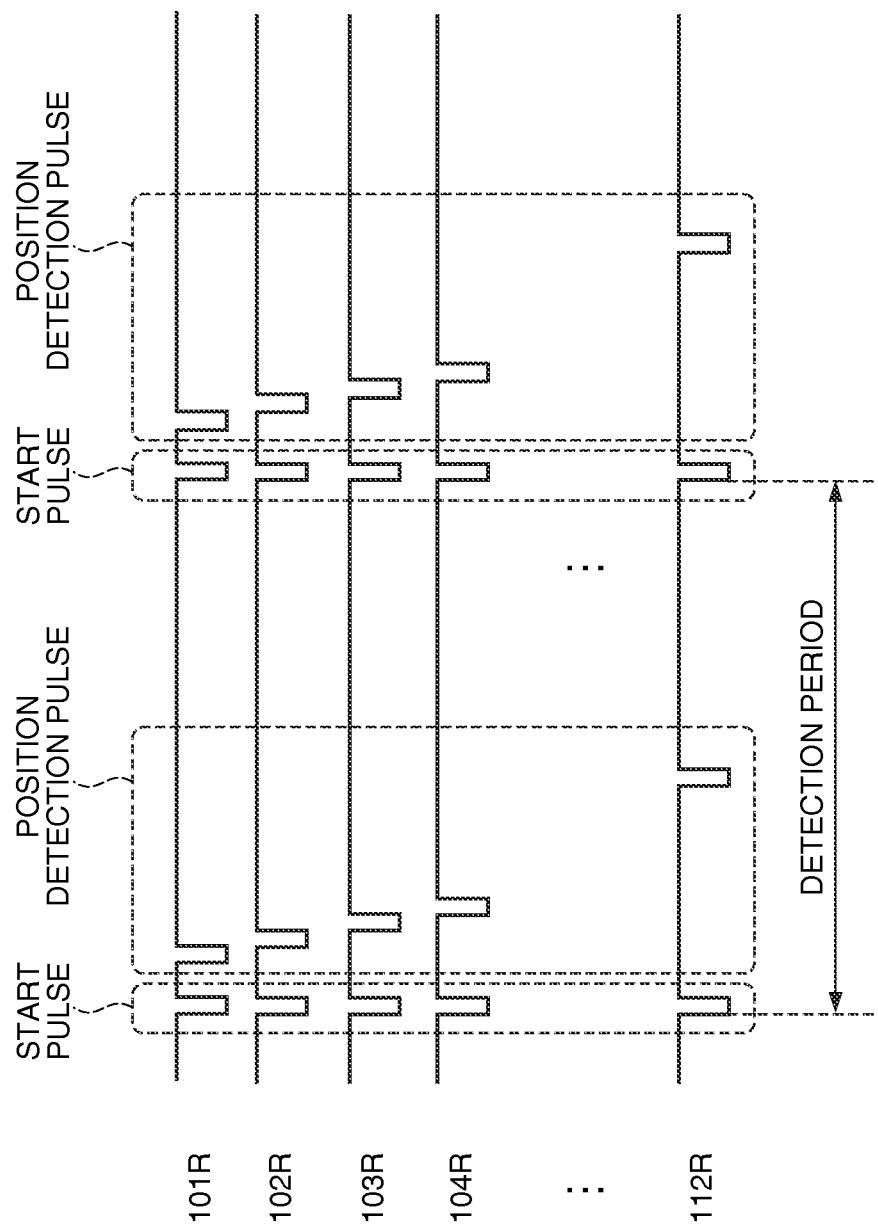
FIG. 4 is a diagram showing a light pulse that is emitted at a unique timing for each light source according to the first embodiment of the invention.

FIG. 4 illustrates light pulses emitted at timings unique to each of the light sources. In a light pulse, an interval between a start pulse and a position detection pulse following the start pulse is unique to each light source. Here, the start pulses are emitted from the light sources at the same timing.

In the example shown in FIG. 4, the interval between the start pulse and the position detection pulse of the light pulse emitted from the red light source 101R is the shortest. On the other hand, the interval between the start pulse and the position detection pulse of the light pulse emitted from the red light source 112R is the longest. Here, it is assumed that the longest interval between the start pulse and the position detection pulse is determined in advance as a time required for detecting all the position detection pulses. Hereinafter, the description will be continued assuming that the light pulses are emitted with the same intensity from the light sources. In addition, at a timing other than the timing of the light pulse, the intensity (level) of light, for example, may change in accordance with an image displayed on the screen.

In addition, an indicated position (coordinates) on the screen on which an image is displayed is detected by the control unit 1110 based on the signal that represents the timing of the light pulse. A time interval between the light pulses is measured by the control unit 1110 by updating a counter at a predetermined period. Here, the interval (detection period) between a start pulse and the next start pulse is shorter than the display period of one frame image and, for example, is 1 [ms]. The detection period is shorter than the display period of one frame image, and accordingly, the control unit 1110 can detect the indicated position in short time. In addition, a user can view a projection image with hardly being influenced by the change in the amount of light according to the light pulse.

Figure 5:
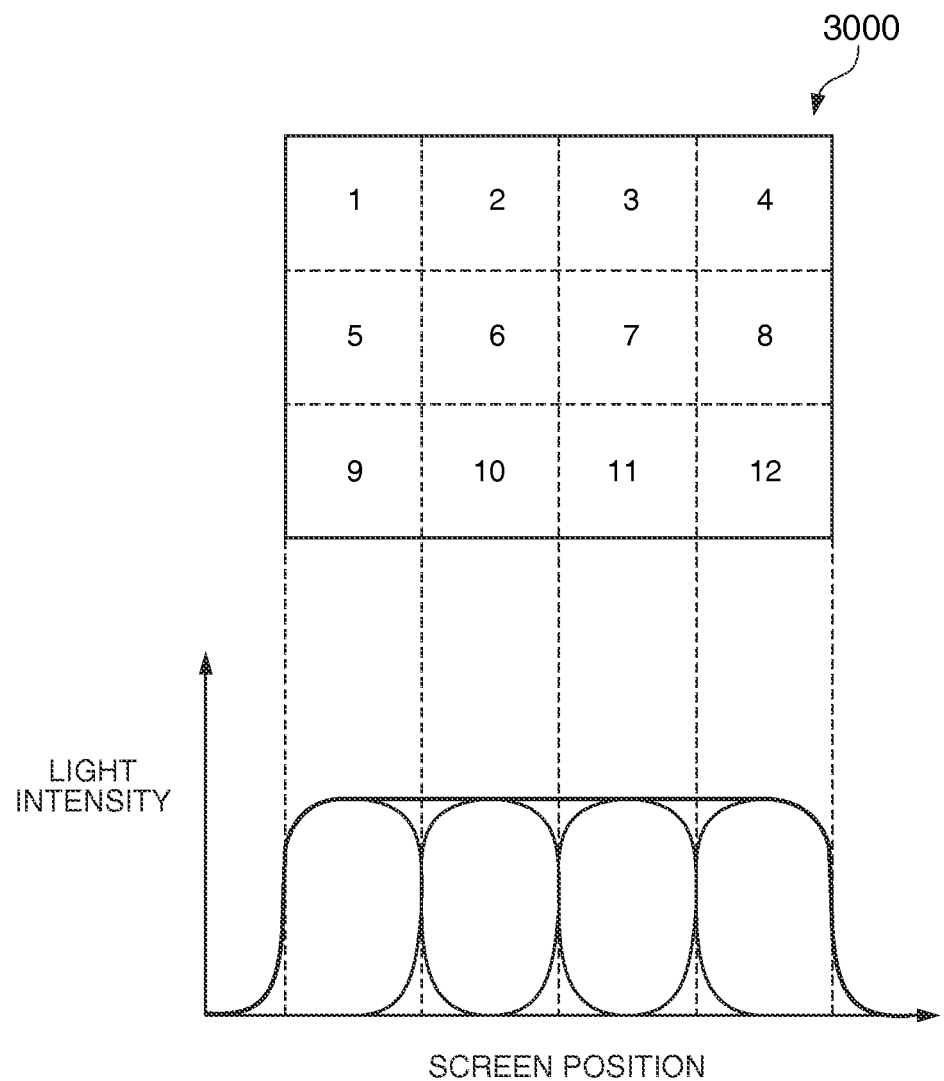
FIG. 5 is a diagram showing the relation between the screen position and the light intensity, according to the first embodiment of the invention.

FIG. 5 shows the relation between the screen position and the light intensity. The screen 3000 is divided in advance into three-row and four-column areas corresponding to the light sources (see FIG. 3). Here, for example, an area 1 of the screen 3000 corresponds to the red light source 101R. In addition, for example, an area 2 of the screen 3000 corresponds to the red light source 102R. Similarly, areas 3 to 12 of the screen 3000 respectively correspond to the red light sources 103R to 112R, respectively. Furthermore, this description similarly applies to the green light source unit 100G and the blue light source unit 100B (see FIG. 2).

As shown in the lower side of FIG. 5, the light pulse is emitted from each light source to not only an area corresponding to the light source but also areas adjacent to the area. Accordingly, the light intensity is approximately uniform on the screen 3000.

In addition, the light pulses emitted to the screen 3000 may be projected from one of the red light source unit 100R, the green light source unit 100G, and the blue light source unit 100B. Hereinafter, for example, a case will be described in which the light pulses emitted to the screen 3000 are projected from the red light source unit 100R.

Figure 6:
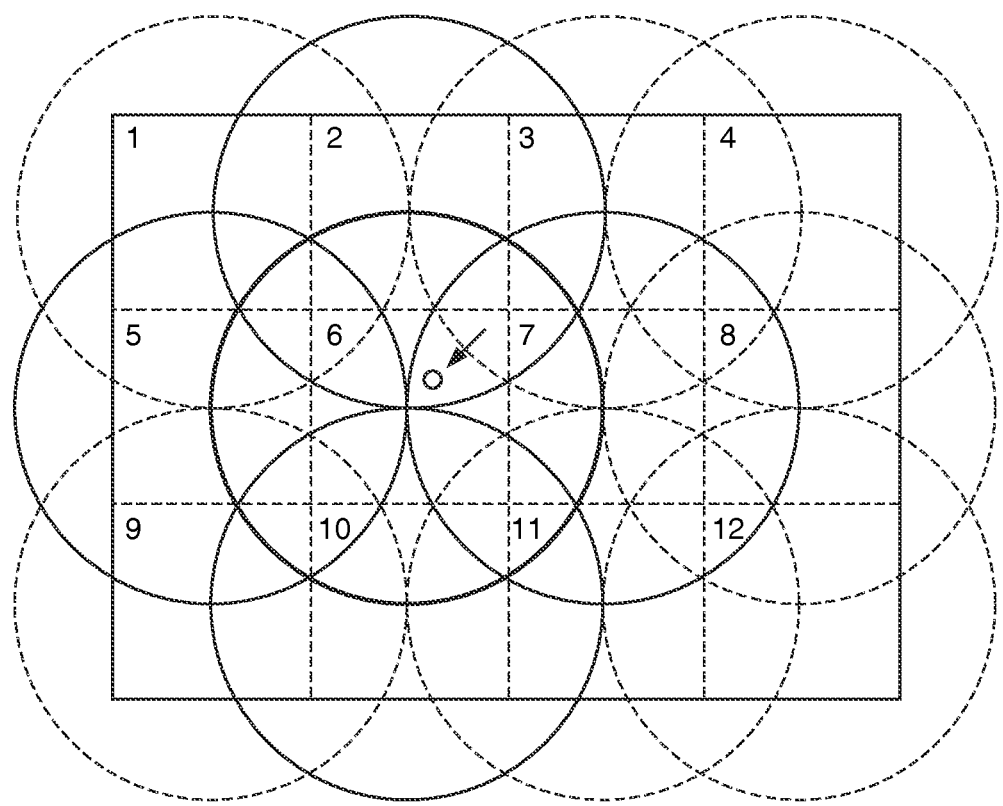
FIG. 6 is the positional relationship between an area and a projection range, according to the first embodiment of the invention.

FIG. 6 shows the positional relationship between the areas and the projection ranges. In FIG. 6, it is assumed that the arrangement (see FIG. 3) of the light sources of the red light source unit 100R is calibrated in advance such that the center of the projection range (a circular range) in which the light pulse is emitted and the center of the area corresponding thereto coincide with each other. A point (a point denoted by an arrow shown in the figure) shown in the area 6 represents an indicated position. Hereinafter, as an example, it is assumed that the indicated position is located at a position that is included in a projection range (a circular range including the area 2) according to the light source 102R, a projection range (a circular range including the area 6) according to the light source 106R, and a projection range (a circular range including the area 7) according to the light source 107R.

Figure 7:
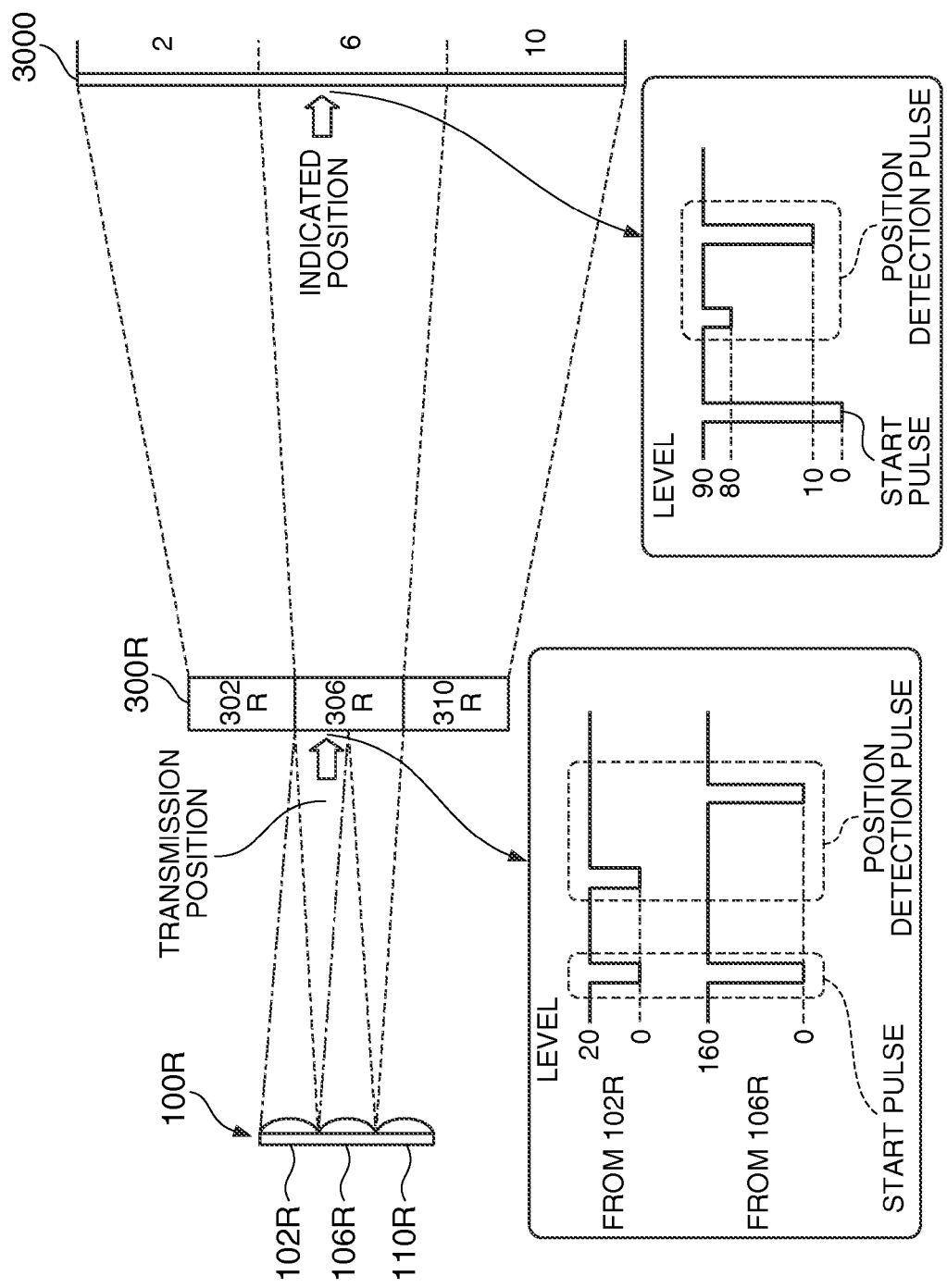
FIG. 7 is a diagram showing the relation between a light pulse projected to a liquid crystal light valve and a light pulse projected onto a screen, according to the first embodiment of the invention.

FIG. 7 shows the relation between a light pulse emitted to the liquid crystal light valve and a light pulse emitted to the screen. As shown in FIG. 7, a light pulse transmitted through a pixel area 306R that configures the red light liquid crystal light valve 300R is emitted to the area 6 of the screen 3000. Hereinafter, a position at which the light pulse emitted to the indicated position is transmitted through the liquid crystal light valve is referred to as a "transmission position".

Here, it is assumed that the red light liquid crystal light valve 300R is arranged with respect to the position of the red light source unit 100R in advance such that a distance from the red light source 106R to the transmission position is shorter than a distance from the red light source 102R to the transmission position. Accordingly, even in a case where light pulses of the same intensity are emitted from the red light source 102R and the red light source 106R, the intensity of the light pulse emitted from the red light source 102R is lower than the intensity of the light pulse emitted from the red light source 106R at the transmission position in accordance with the distance of the path of the light pulse.

As shown in FIG. 7, for example, it is assumed that the intensity of the light pulse emitted from the red light source 102R at the transmission position is 20. On the other hand, it is assumed that the intensity of the light pulse emitted from the red light source 106R at the transmission position is 160. The light pulses overlap each other at the transmission position.

Here, the transmittance of the pixel area 306R, for example, is assumed to be 50 [%]=(0.50). A start pulse acquired by allowing the start pulse emitted from the red light source 102R and the start pulse emitted from the red light source 106R to overlap each other has an intensity of 90 (=(level 20+level 160)×transmittance 0.50) at the indicated position on the screen 3000. On the other hand, the position detection pulse emitted from the red light source 102R has an intensity of 10 (=level 20×0.50) at the indicated position on the screen 3000. Similarly, the position detection pulse emitted from the red light source 106R has an intensity of 80 (=level 160×0.50) at the indicated position on the screen 3000.

Figure 8:
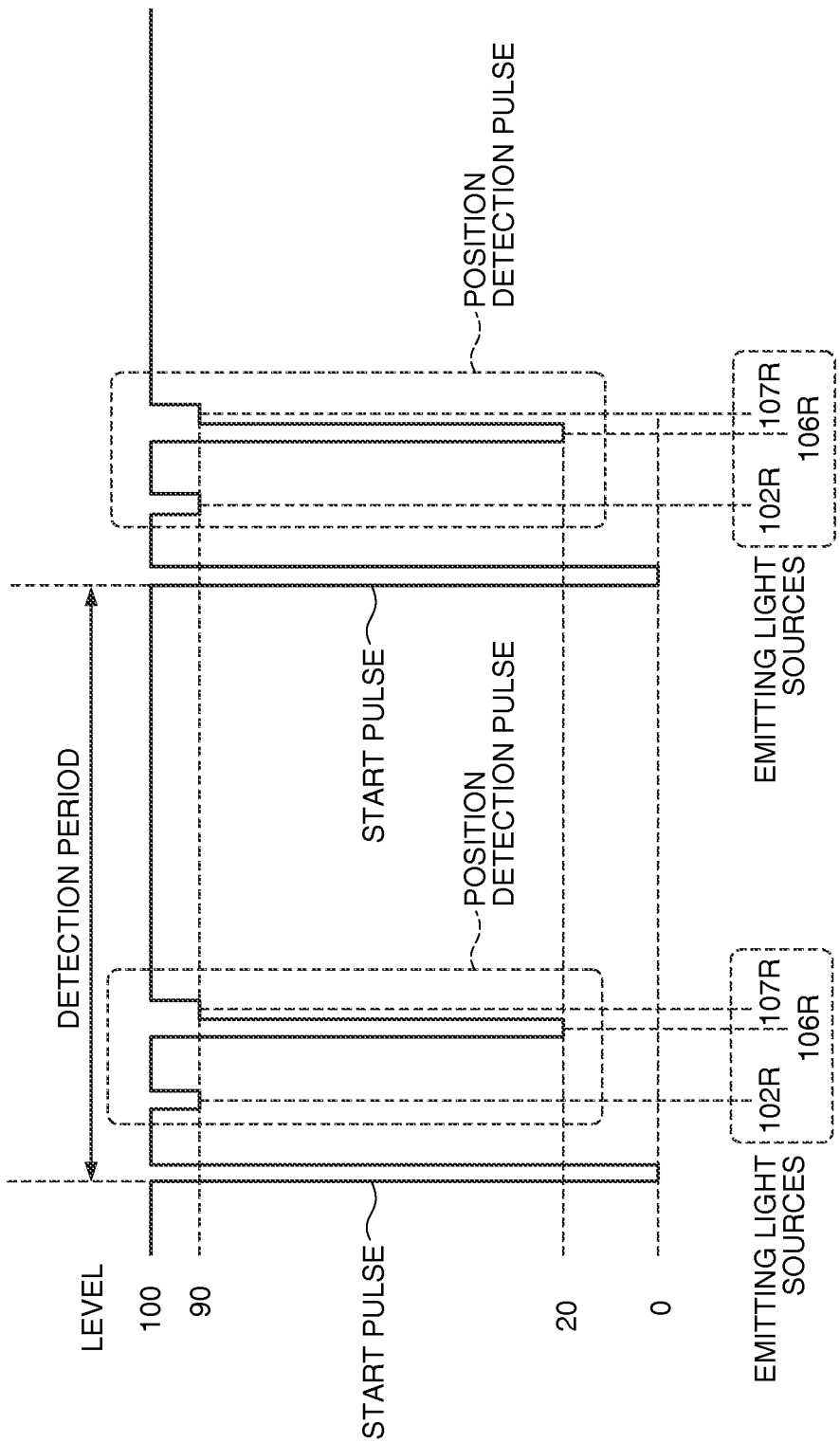
FIG. 8 is a diagram showing a light pulse projected onto the screen according to the first embodiment of the invention.

FIG. 8 shows a light pulse emitted to the screen. Since the indicated position is also included in any one of the projection range according to the light source 102R, the projection range according to the light source 106R, and the projection range according to the light source 107R (see FIG. 6), a start pulse at the indicated position is a start pulse acquired by allowing the start pulse emitted from the red light source 102R, the start pulse emitted from the red light source 106R, and the start pulse emitted from the red light source 107R to overlap one another. As shown in FIG. 8, the start pulse acquired through the overlapping of the start pulses has an intensity of 100 (=(level 20+level 160+level 20)×transmittance 0.50). On the other hand, since the position detection pulses have different emission timings, they do not overlap each other. Accordingly, in order to calculate the intensity of the position detection pulse at the indicated position, the intensity at the transmission position may be multiplied only by 0.50.

Since the indicated position is also included in any one of the projection range according to the light source 102R, the projection range according to the light source 106R, and the projection range according to the light source 107R (see FIG. 6), as position detection pulses at the indicated position, there are three position detection pulses including the position detection pulse emitted from the red light source 102R, the position detection pulse emitted from the red light source 106R, and the position detection pulse emitted from the red light source 107R. As shown in FIG. 8, the intensity of the position detection pulse emitted from the red light source 102R is 10. In addition, the intensity of the position detection pulse emitted from the red light source 106R is 80. Furthermore, the intensity of the position detection pulse emitted from the red light source 107R is 10.

Accordingly, in the case shown in FIG. 8, the intensity of the start pulses overlapping with one another:the intensity of the position detection pulse emitted from the red light source 102R:the intensity of the position detection pulse emitted from the red light source 106R:the intensity of the position detection pulse emitted from the red light source 107R=1.0:0.1:0.8:0.1. In other words, the intensity of the position detection pulse emitted from the red light source 102R:the intensity of the position detection pulse emitted from the red light source 106R:the intensity of the position detection pulse emitted from the red light source 107R=1:8:1.

Figure 9:
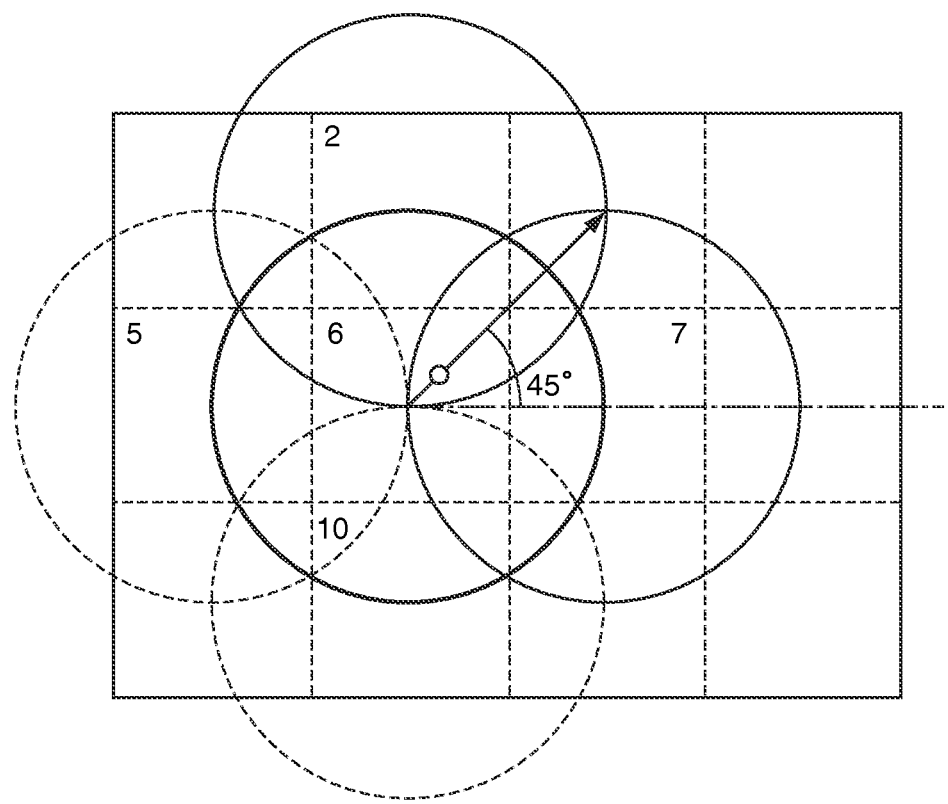
FIG. 9 is a diagram illustrating a method of detecting the slope of a vector according to an indicated position, according to the first embodiment of the invention.

FIG. 9 is a diagram illustrating a method of detecting the slope of a vector according to an indicated position. The vector shown in FIG. 9 is a vector that starts from the center of the area 6 corresponding to the red light source 106R emitting the position detection pulse having the highest intensity ratio out of the position detection pulses (see FIG. 8) and passes through the indicated position. Here, the ratios of the intensity of the start pulses (see FIG. 8) overlapping one another to the intensities of the position detection pulses (see FIG. 8) emitted to the areas 2, 5, 7, and 10 adjacent to the area 6 are calculated by the control unit 1110. Here, instead of the ratios of the start pulses overlapping one another to the position detection pulses, the ratios between the position detection pulses emitted to the areas 2, 5, 7, and 10 that are adjacent to the area 6 may be calculated.

In the example shown in FIGS. 8 and 9, the ratio of the intensity of the start pulses overlapping one another to the intensity of the position detection pulse emitted from the red light source 105R (see FIG. 3) is 1.0:0.0. In addition, the ratio of the intensity of the start pulses overlapping one another to the intensity of the position detection pulse emitted from the red light source 110R (see FIG. 3) is 1.0:0.0. Furthermore, the ratio of the intensity of the start pulses overlapping one another to the intensity of the position detection pulse emitted from the red light source 102R (see FIG. 3) is 1.0:0.1. In addition, the ratio of the intensity of the start pulses overlapping one another to the intensity of the position detection pulse emitted from the red light source 107R (see FIG. 3) is 1.0:0.1. In other words, the intensity of the position detection pulse emitted from the red light source 102R and the intensity of the position detection pulse emitted from the red light source 107R are the same. Based on the ratios between the intensities, the control unit 1110 detects that the vector is inclined by 45 degrees counterclockwise from the center of the area 6 with respect to the horizontal direction (row direction) of the screen.

Figure 10:
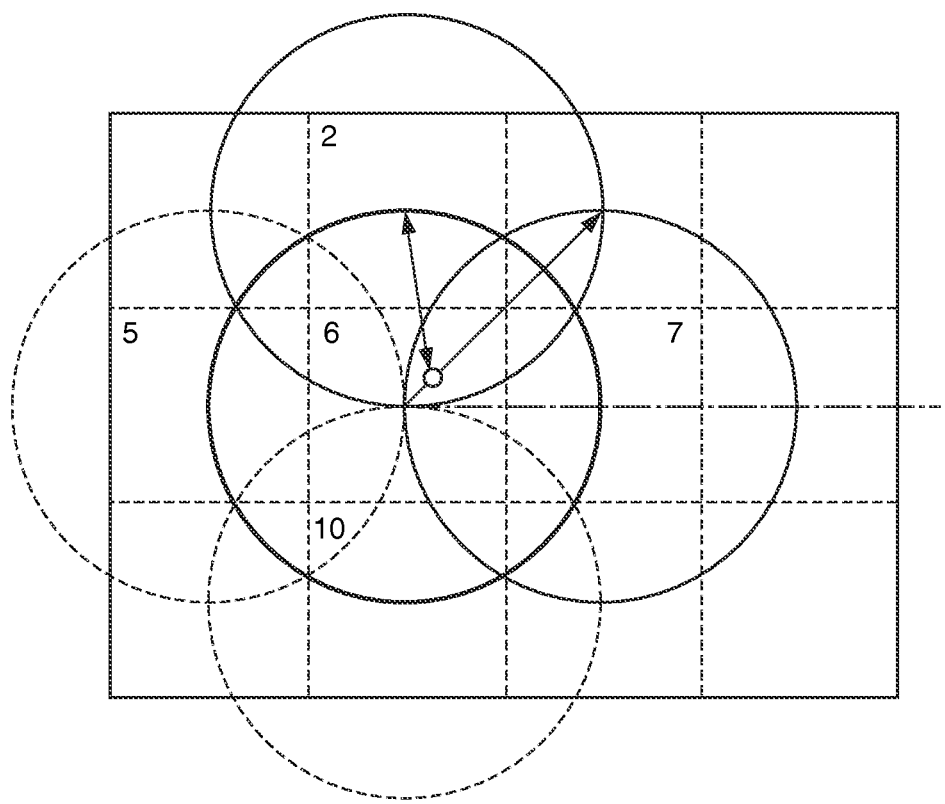
FIG. 10 is a diagram illustrating a method of detecting the indicated position according to the first embodiment of the invention.

FIG. 10 is a diagram illustrating the method of detecting the indicated position. A distance from the center of the area 2 corresponding to the red light source 102R to a designated position is detected by referring to a lookup table (LUT) by using the control unit 1110 based on that the ratio of the start pulses overlapping one another to the intensity of the position detection pulse emitted from the red light source 102R is 1.0:0.1. In this lookup table, the relationship between the ratio between the intensities of the position detection pulses and a distance from the center of the area on the screen 3000 is measured and registered in advance.

In the example shown in FIG. 10, the indicated position (coordinates) is detected by referring to the lookup table by using the control unit 1110 based on the slope of the vector as 45 degrees and the distance from the center of the area 2 to the indicated position. In addition, in a case where there are two light sources that have the highest ratio between the intensities of the light pulses, it represents that the indicated position is located at the boundary of areas corresponding to the light sources.

Next, the sequence of detecting the indicated position in the position detecting system will be described.

Figure 11:
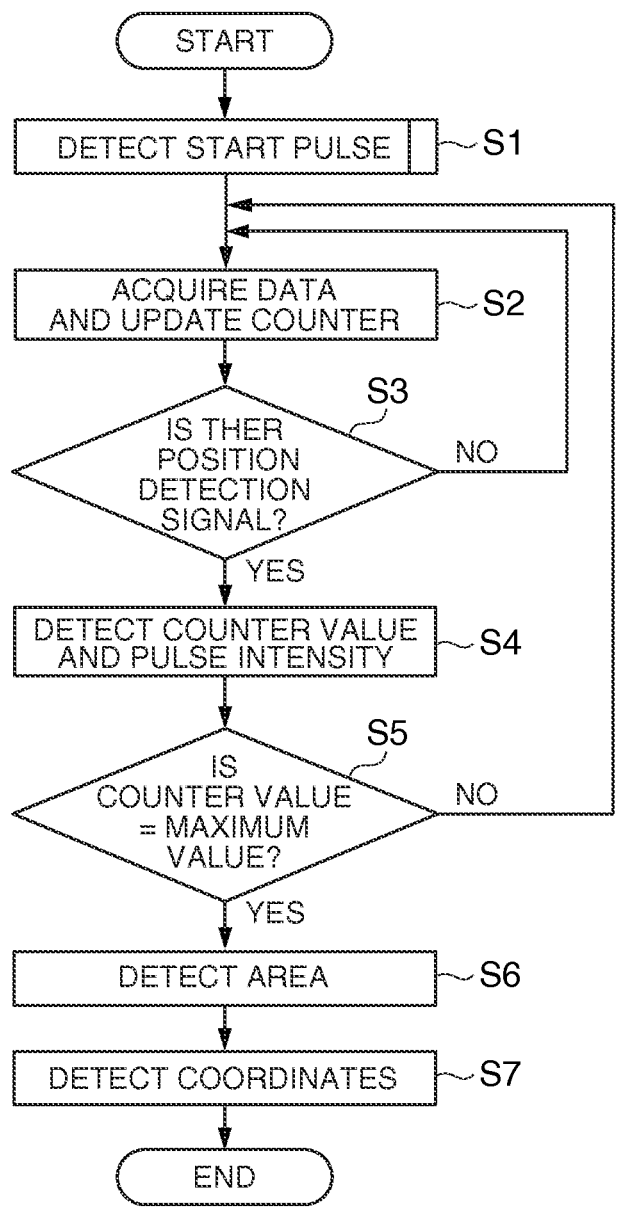
FIG. 11 is a flowchart showing the sequence of detecting an indicated position in a position detecting system according to the first embodiment of the invention.

FIG. 11 is a flowchart showing the sequence of detecting an indicated position in the position detecting system. The sequence shown in FIG. 11 is performed at a predetermined detection period. The control unit 1110 is assumed to detect a start pulse included in the signal representing the timing of a light pulse (Step S1). In order to further detect a position detection pulse, the control unit 1110 updates a counter that is used for measuring an interval between light pulses (Step S2).

The control unit 1110 determines whether a position detection pulse has been detected, in other words, whether data having a predetermined voltage difference has been detected in the signal representing the timing of a light pulse (Step S3). In a case where a position detection pulse has not been detected (No in Step S3), the process of the control unit 1110 is returned to Step S2. On the other hand, in a case where the position detection pulse has been detected (Yes in Step S3), the control unit 1110 detects a light source emitting the position detection pulse based on the updated counter value. In addition, the control unit 1110 detects the intensity of the position detection pulse based on the signal representing the timing of the light pulse (Step S4).

The control unit 1110 determines whether or not a maximum value determined in advance and the counter value coincide with each other (Step S5). In a case where the maximum value determined in advance and the counter value do not coincide with each other (No in Step S5), the process of the control unit 1110 is returned to Step S2. On the other hand, in a case where the maximum value determined in advance and the counter value coincide with each other (Yes in Step S5), the control unit 1110 calculates the ratios of the intensities of the start pulses overlapping each other to the intensities of other position detection pulses. In addition, the control unit 1110 detects an area corresponding to a light source having the highest ratio of the intensity of the start pulses to the intensity of the position detection pulse (see FIG. 8) (Step S6).

Then, the control unit 1110 detects the slope of the vector according to the indicated position (see FIG. 9). In addition, the control unit 1110 detects the indicated position (coordinates) by calculating the distance from the center of the area to the indicated position (see FIG. 10) based on the ratio to the intensity of the position detection pulse by referring to a lookup table (Step S7). As above, since the indicated position is detected based on the ratio between the intensities of the light pulses, the position detecting system can display an image according to the indicated position without receiving the influence of a noise.

Here, the control unit that detects the indicated position may be included in the indicating device. In such a case, the position detecting system includes: an indicating device that includes a photodiode 2010 that receives a light pulse and detects the timing of the light pulse, a control unit (not illustrated in the figure) that detects the position of the device to which it belongs on a screen on which an image is displayed in accordance with the timing, and a transmission unit 2030 that transmits a signal representing the position; and an image display device that includes a reception unit 1150 that receives the signal representing the position from the transmission unit 2030 and a plurality of red light source units 100R, green light source units 100G, and blue light source units 100B that emit light pulses to areas acquired by dividing the screen into multiple parts at timings unique to each of the light sources.

Second Embodiment

In a second embodiment, the projection range in which the light pulse is emitted does not overlap other projection ranges, which is different from the first embodiment. In the second embodiment, only differences from the first embodiment will be described.

The red light sources 101R to 112R (see FIG. 3) respectively emit light pulses only to areas corresponding to the light sources at timings unique to each of the light sources. In other words, each light source emits light pulses only to an area corresponding thereto such that the projection range in which the light pulses are emitted does not overlap other projection ranges.

In addition, the control unit 1110 detects the position of the indicating device 2000 for each area based on only the interval between the start pulse and the position detection pulse included in the signal representing the timing. Since the projection ranges do not overlap each other, in the signal representing the timing, only one position detection pulse corresponding to the position of the indicating device 2000 is detected. The control unit 1110 detects a position at which the indicated position is located inside the area corresponding to one position detection pulse.

According to such a configuration, since the position detecting system detects the position of the indicating device for each area based on the interval between the start pulse and the position detection pulse that is unique to each light source, an image according to the indicated position of the indicating device for each area can be displayed.

Third Embodiment

In a third embodiment, the position detecting system includes a plurality of image display devices (multi-projector), which is different from the first and second embodiments. In the third embodiment, only differences from the first and second embodiments will be described.

Figure 12:
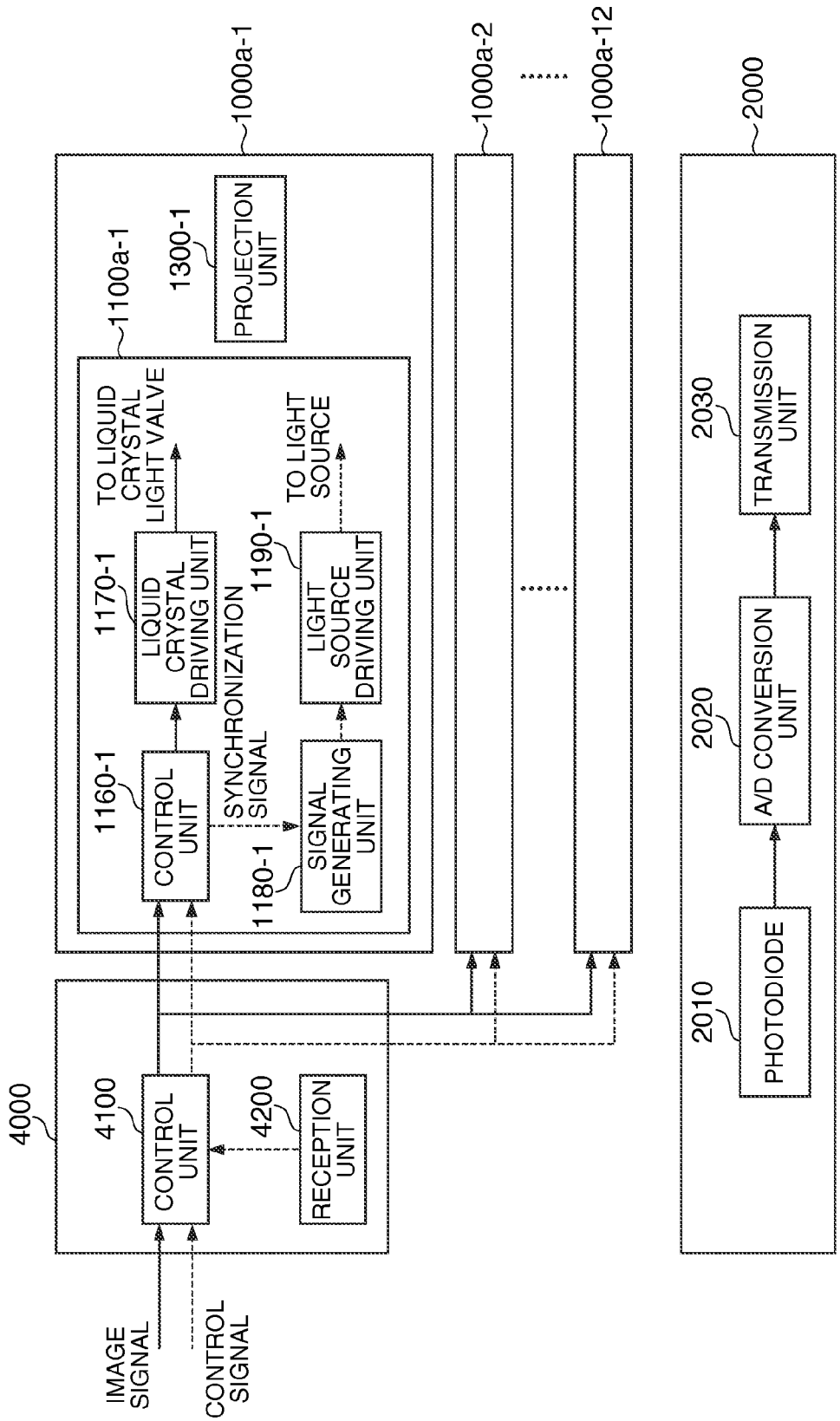
FIG. 12 is a diagram showing the configuration of a position detecting system according to a third embodiment of the invention.

FIG. 12 shows the configuration of the position detecting system. The position detecting system includes a plurality of image display devices 1000a, a control device 4000, and an indicating device 2000. Hereinafter, as an example, the position detecting system is assumed to include image display devices 1000a-1 to 1000a-12 for the description. Here, when aspects common to the image display devices 1000a-1 to 1000a-12 are described, a notation of an "image display device 1000a" acquired by omitting the detailed reference numeral will be used.

The control device 4000 includes a control unit 4100 and a reception unit 4200. The reception unit 4200 receives a signal that represents the timing of a light pulse from the transmission unit 2030 of the indicating device 2000 and transmits the signal to the control unit 4100. In a case where a plurality of the indicating devices 2000 are included in the position detecting system, the reception unit 4200 transmits a signal that represents the timing of a light pulse to the control unit 4100 for each received identification number.

An image signal and a control signal are input to the control unit 4100. The control unit 4100 performs predetermined signal processing for the image signal based on the control signal. Here, the control unit 4100 cuts the input image signal into parts and distributes the cut image signals to the image display devices 1000a-1 to 1000a-12 that are responsible for the projection. The control unit 4100, for example, is a DSP.

A signal representing the timing of a light pulse is input to the control unit 4100 from the reception unit 4200. In addition, in a case where a plurality of the indicating devices 2000 are included in the position detecting system, an identification number used for identifying each indicating device is input to the control unit 4100 from the reception unit 4200. The control unit 4100 detects the indicated position based on the signal representing the timing of a light pulse. Here, the control unit 4100 detects the indicated position based on the timings of a plurality of light pulses of one light source (the image display device 1000a) and one or more light sources (the image display device 1000a) adjacent to the light source. The method of detecting the indicated position is similar to that described with reference to FIGS. 4 and 9 to 11.

The control unit 4100 outputs an image signal that represents an image (interactive image) corresponding to the indicated position to the image display device 1000a. For example, the control unit 4100 outputs an image signal that represents an image overlapped by a cursor at the indicated position to the image display device 1000a so as to display the cursor at the indicated position.

The control unit 4100 stores information that represents the arrangement of the image display devices 1000a-1 to 1000a-12 in advance. The information that represents the arrangement of the image display devices 1000a-1 to 1000a-12 will be described later with reference to FIG. 17.

Here, the control unit 4100 may be included in each one of the image display devices 1000*a*-1 to 1000*a*-12. In such a case, the control unit 4100 communicates with the control units 4100 of the other image display devices 1000*a*, distributes cut image signals, and detects an indicated position.

Since the image display devices 1000*a*-1 to 1000*a*-12 have the same configuration, hereinafter, the configuration of the image display device 1000*a*-1 will be described. The image display device 1000*a*-1 includes a position detecting device 1100*a*-1 and a projection unit 1300-1. The position detecting device 1100*a*-1 includes a control unit 1160-1, a liquid crystal driving unit 1170-1, a signal generating unit 1180-1, and a light source driving unit 1190-1.

A cut image signal and a control signal are input to the control unit 1160-1. The control unit 1160-1 performs predetermined correction for the cut image signal and outputs the corrected image signal to the liquid crystal driving unit 1170-1. The control unit 1160-1, for example, is a DSP. In addition, the control unit 1160-1 outputs a synchronization signal that is synchronized with the display timing of the image to the signal generating unit 1180-1. The synchronization signal, for example, is a vertical synchronization signal (Vsync).

The liquid crystal driving unit 1170-1 drives each liquid crystal light valve (optical modulation device) (to be described later with reference to FIG. 13) in accordance with a corrected image signal that represents an image according to the indicated position.

The signal generating unit 1180-1 controls the light source driving unit 1190-1 in synchronization with a synchronization signal. Here, the signal generating unit 1180-1 generates timing information of light pulses of which timings are unique to each of the image display devices 1000*a*-1 to 1000*a*-12 and outputs the generated timing information to the light source driving unit 1190-1. The light source driving unit 1190-1 emits a light pulse from the projection unit 1300-1 based on the timing information to the area on the screen 3000 which corresponds to the device it belongs to.

Figure 13:
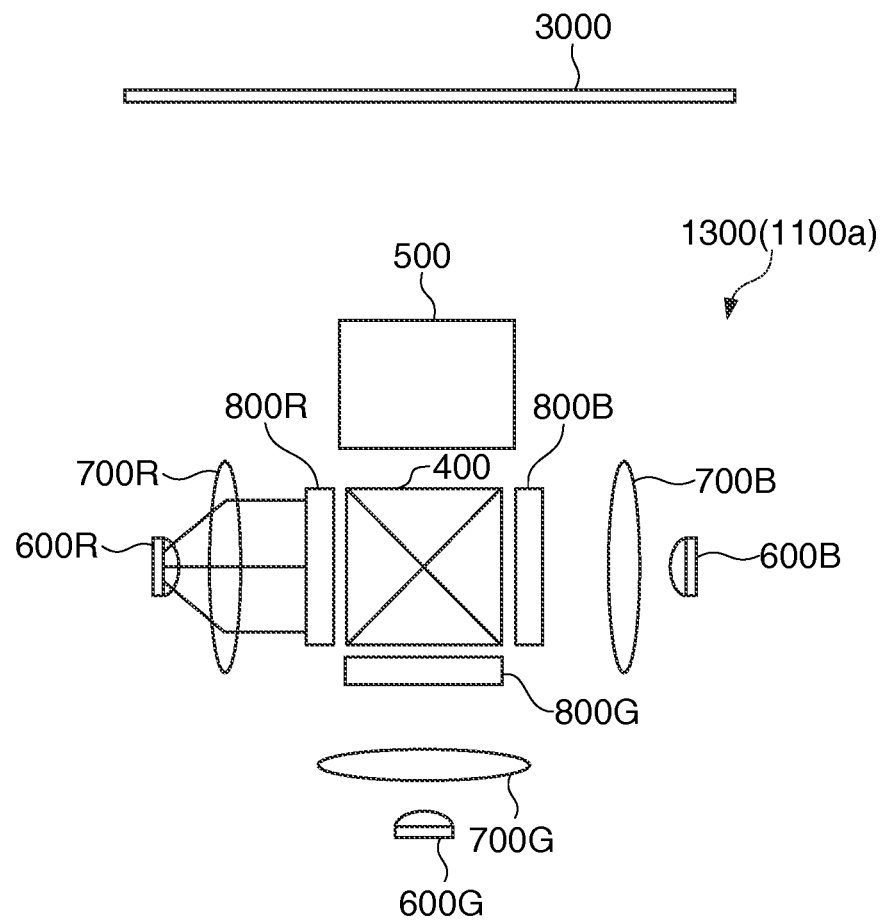
FIG. 13 is a diagram showing the configuration of a projection unit according to the third embodiment of the invention.

FIG. 13 shows the configuration of the projection unit. The projection unit 1300-1 includes a cross-dichroic prism 400 and a projection optical system 500. In addition, the projection unit 1300-1 includes a red light source unit (R-LED) 600R, a red light collimator optical system 700R, and a red light liquid crystal light valve 800R. Furthermore, the projection unit 1300-1 includes a green light source unit (G-LED) 600G, a green light collimator optical system 700G, and a green light liquid crystal light valve 800G. In addition, the projection unit 1300-1 includes a blue light source unit (B-LED) 600B, a blue light collimator optical system. 700B, and a blue light liquid crystal light valve 800B. Furthermore, each light source unit may be included not in the projection unit 1300-1 but in the position detecting device 1100*a*-1.

The light pulses emitted to the screen 3000 may be projected from one of the red light source unit 600R, the green light source unit 600G, and the blue light source unit 600B. Hereinafter, for example, a case will be described in which the light pulses emitted to the screen 3000 are projected from the red light source unit 600R.

The red light collimator optical system 700R uniformizes the illumination distribution of the red light LR projected by the red light source unit 600R in the red light liquid crystal light valve 800R. The green light collimator optical system 700G and the blue light collimator optical system 700B have functions similar thereto.

The red light liquid crystal light valve 800R, the green light liquid crystal light valve 800G, and the blue light liquid crystal light valve 800B are optical modulation devices. The red light LR modulated by the red light liquid crystal light valve 800R is incident to the cross-dichroic prism 400. In addition, the green light LG modulated by the green light liquid crystal light valve 800G is incident to the cross-dichroic prism 400 in a direction different from the direction of the red light LR. Furthermore, the blue light LB modulated by the blue light liquid crystal light valve 800B is incident to the cross-dichroic prism 400 in a direction different from the directions of the red light LR and the green light LG.

The cross-dichroic prism 400 has a structure formed by bonding rectangular prisms, and, on the inner face of the structure, a mirror surface reflecting the red light LR and a mirror surface reflecting the blue light LB are formed in a cross shape. The red light LR, the green light LG, and the blue light LB pass through the mirror surfaces so as to be composed. The composed light forms an image.

The projection optical system 500 includes a projection lens. The image formed by the cross-dichroic prism 400 is projected onto the screen 3000 in an enlarged scale by the projection lens. Accordingly, the projection unit 1200 projects an image onto the screen 3000 (screen) by using the emission of each light source unit.

Figure 14:
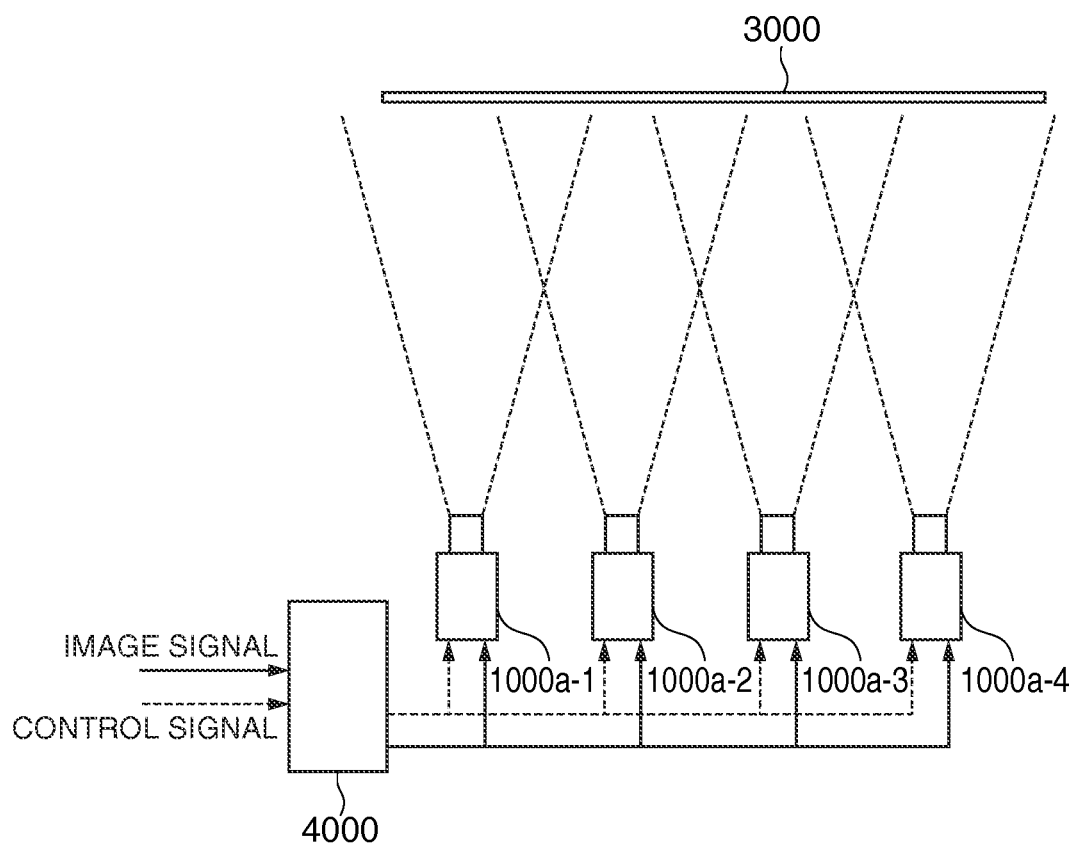
FIG. 14 is a top view showing an example of the arrangement of an image display device according to the third embodiment of the invention.

FIG. 14 shows an example of the arrangement of the image display device as a top view. The position detecting system arranges the image display device 1000*a*-1 at a position at which an image can be projected onto an area 1 (to be described later with reference to FIG. 15) located on the screen 3000 and a position at which a light pulse can be emitted. In addition, the position detecting system arranges the image display device 1000*a*-2 at a position at which an image can be projected onto an area 2 (to be described later with reference to FIG. 15) located on the screen 3000 and a position at which a light pulse can be emitted. The image display devices 1000*a*-3 to 1000*a*-12 are similarly arranged. In other words, the image display devices 1000*a*-1 to 1000*a*-12 are arranged in a three-row and four-column pattern in front of the screen 3000.

Figure 15:
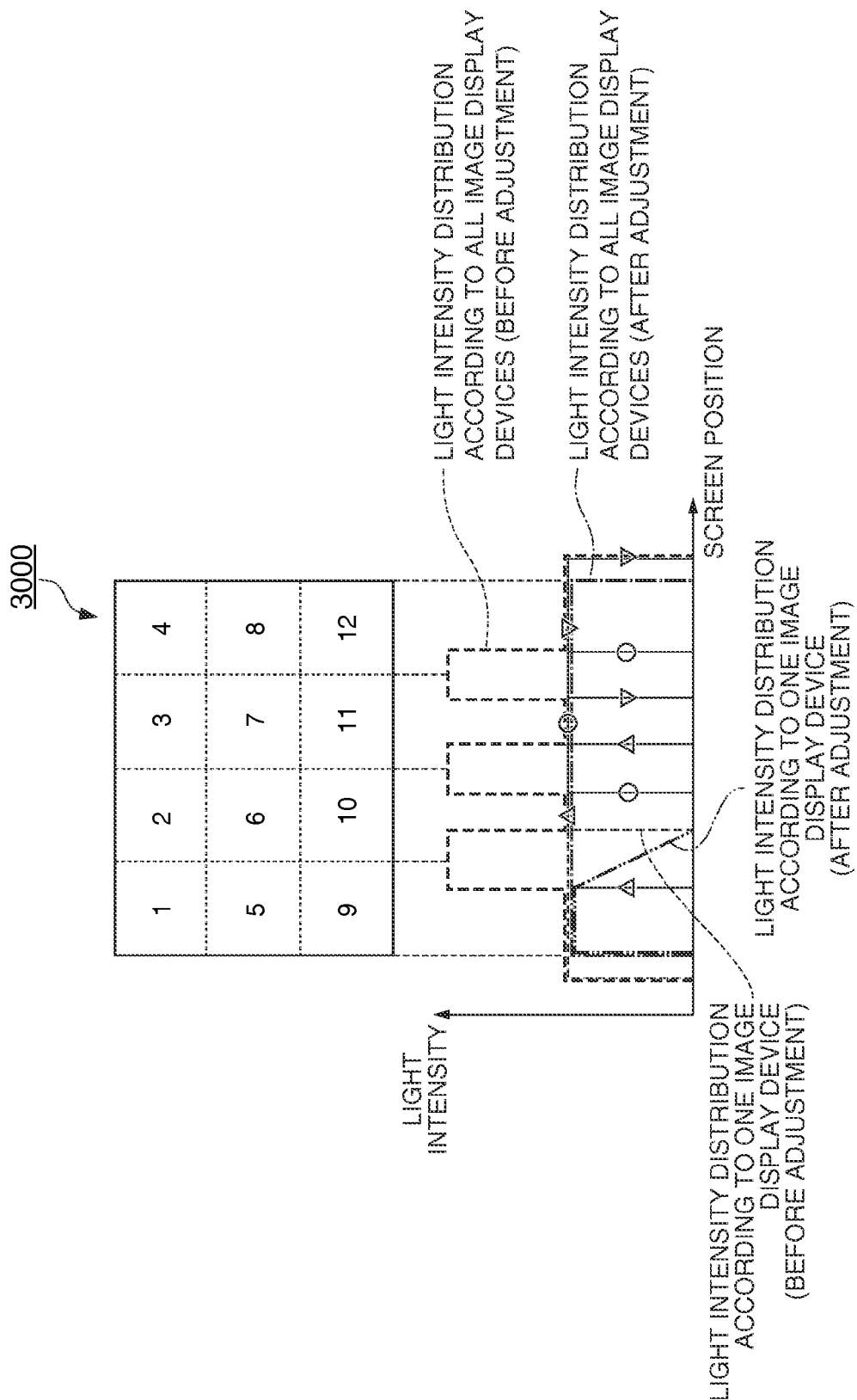
FIG. 15 is a diagram showing the relation between the screen position and the light intensity, according to the third embodiment of the invention.

FIG. 15 shows the relation between the screen position and the light intensity. The screen 3000 is divided in advance into three-row and four-column areas corresponding to the image display devices 1000*a*. The projection light according to the image display device 1000*a*-1 is projected to the area 1 such that the projection range overlaps areas adjacent to the area 1 (see the "light intensity distribution according to one image display device (before adjustment)" on the lower side of FIG. 15). In addition, the projection light according to the image display device 1000*a*-2 is projected to the area 2 such that the projection range overlaps areas adjacent to the area 2 (see each solid line that a triangular mark overlaps on the lower side of FIG. 15). Furthermore, the projection light according to the image display device 1000*a*-3 is projected to the area 3 such that the projection range overlaps areas adjacent to the area 3 (see each solid line that a circular mark overlaps on the lower side of FIG. 15). In addition, the projection light according to the image display device 1000*a*-4 is projected to the area 4 such that the projection range overlaps areas adjacent to the area 4 (see each solid line that a reverse triangular mark overlaps on the lower side of FIG. 15). This description similarly applies to the image display devices 1000*a*-5 to 1000*a*-12. Accordingly, in a case where each image display device 1000*a* does not perform edge blending (the adjustment of the distribution of the light intensity), as denoted by the "light intensity distribution according to all the image display devices (before adjustment)" on the lower side of FIG. 15, the entire screen 3000 does not have a uniform light intensity distribution.

Each image display device 1000*a* performs edge blending. Here, the transmittances of the liquid crystal light valve 800R, the liquid crystal light valve 800G, and the liquid crystal light valve 800B (see the lower side of FIG. 13) of the image display device 1000a-1, as denoted by the "light intensity distribution according to one image display device (after adjustment)" on the lower side of FIG. 15, are adjusted so as to form a uniform light intensity distribution in adjacent areas. This description similarly applies to the image display devices 1000a-2 to 1000a-12. Accordingly, in a case where each image display device 1000a performs the edge blending (the adjustment of the light intensity distribution), as denoted by the "light intensity distribution according to all the image display devices (afteradjustment)" on the lower side of FIG. 15, the entire screen 3000 has a uniform light intensity distribution. In addition, the cut range of the image may be adjusted by the control unit 4100 (see FIG. 12). Accordingly, the image display device 1000a can prevent visual recognition of boundaries of images projected from the other image display devices 1000a in the overlapped projection range.

Figure 16:
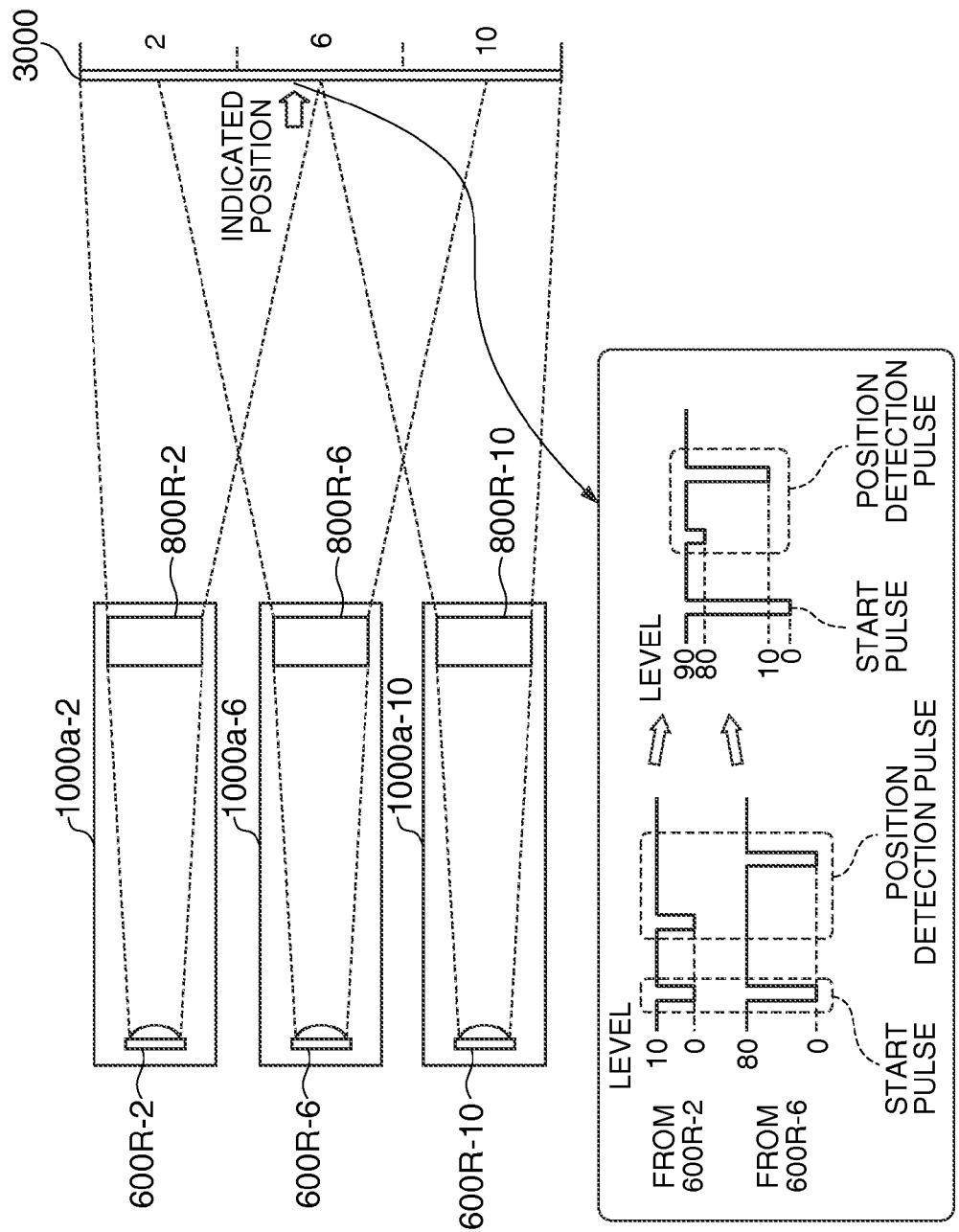
FIG. 16 is a diagram showing the relation between a light pulse projected to a liquid crystal light valve and a light pulse projected onto a screen, according to the third embodiment of the invention.

FIG. 16 shows the relation between a light pulse emitted to the liquid crystal light valve and a light pulse emitted to the screen. Hereinafter, as an example, it is assumed that the indicated position is located at a position that is included in a projection range (the projection range, for which edge blending is performed, including the area 2) according to the red light source unit 600R-2 and a projection range (the projection range, for which edge blending is performed, including the area 6) according to the red light source unit 600R-6.

At the indicated position, the light pulse emitted from the red light source unit 600R-2 and the light pulse emitted from the red light source unit 600R-6 overlap each other. FIG. 16 shows a case in which the intensity of a start pulse acquired by allowing the start pulse emitted from the red light source unit 600R-2 and the start pulse emitted from the red light source unit 600R-6 to overlap each other is 90 at the indicated position located on the screen 3000, similarly to the first embodiment. Similarly, a case is shown in which the intensity of the position detection pulse emitted from the red light source unit 600R-2 is 10 at the indicated position located on the screen 3000, similarly to the first embodiment. Furthermore, a case is shown in which the intensity of the position detection pulse emitted from the red light source unit 600R-6 is 80 at the indicated position located on the screen 3000, similarly to the first embodiment.

As above, in the overlapped projection range, since a plurality of light pulses are emitted from the other image display devices 1000a, the control unit 4100 (see FIG. 12) of the control device 4000 can detect an indicated position with high accuracy based on the plurality of light pulses by using the method described with reference to FIGS. 4 and 9 to 11, and the like.

Figure 17:
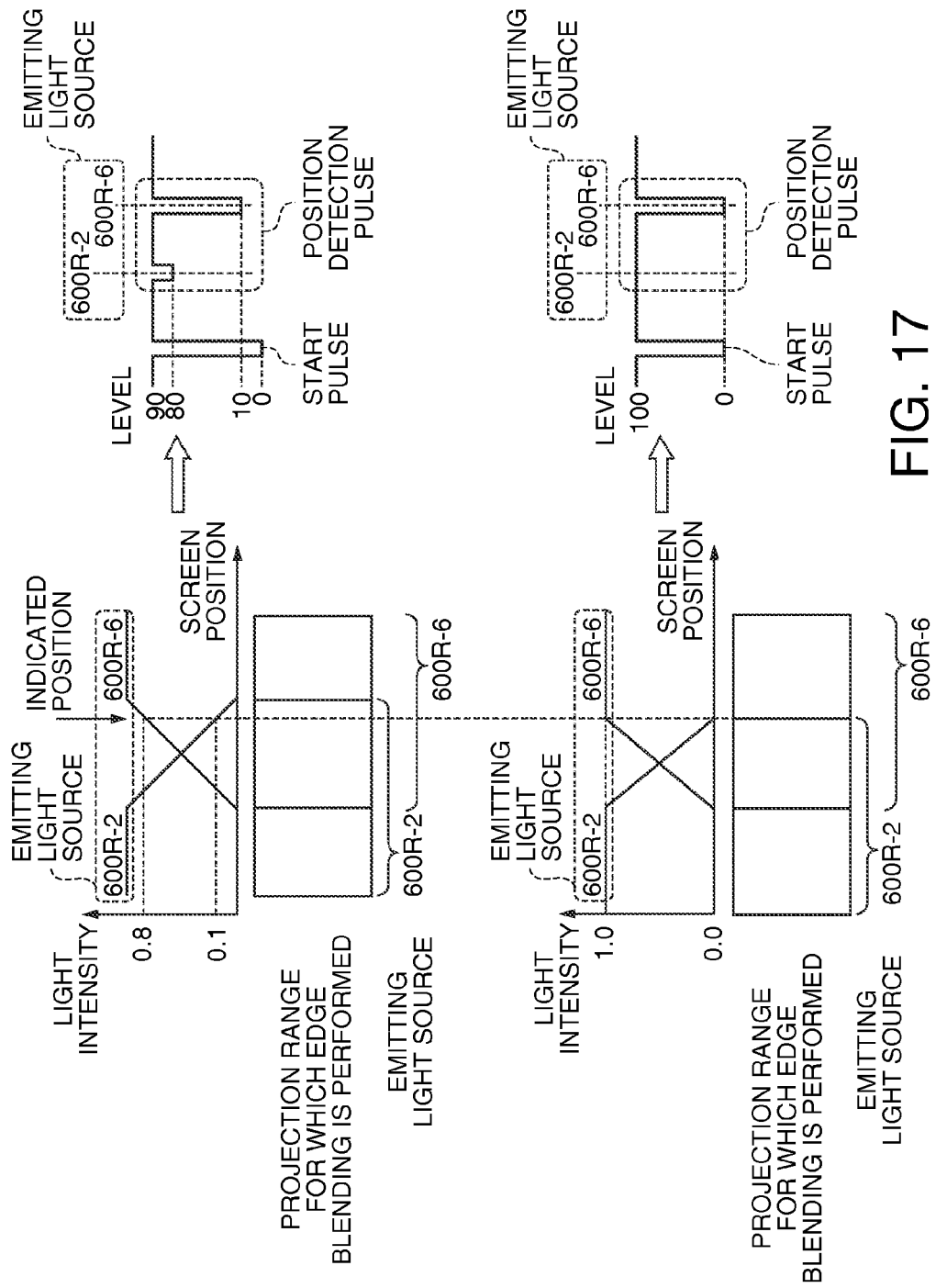
FIG. 17 is a diagram showing the relation between a projection range and a light pulse, according to the third embodiment of the invention.

FIG. 17 shows the relation between the projection range and the light pulse. On the upper side of FIG. 17, the light intensity distribution, an overlapped projection range, and the intensity of the light pulse are shown in the case shown in FIG. 16. In such a case, at the indicated position, the position detection pulse emitted from the red light source unit 600R-2 and the position detection pulse emitted from the red light source unit 600R-6 are detected.

On the lower side of FIG. 17, a light intensity distribution and an overlapped projection range, and the intensity of the light pulse are shown in a case where the amount of the overlapped projection range is smaller than that of the case shown in FIG. 16. In such a case, even at the same indicated position, the position detection pulse emitted from the red light source unit 600R-2 is not detected.

As above, even at the same indicated position located on the screen 3000, the ratio between the intensities of light pulses changes in accordance with the arrangement (see FIG. 14) of the image display device 1000a. Accordingly, the control unit 4100 (see FIG. 12) of the control device 4000 stores light pulse waveforms at each screen position in advance as information that represents the arrangement of the image display devices 1000a-1 to 1000a-12. The control unit 4100 detects the indicated position based on the light pulse waveforms at each screen position.

Here, the control unit that detects the indicated position may be included in the indicating device. In such a case, the position detecting system includes: an indicating device that includes a photodiode 2010 that receives a light pulse and detects the timing of the light pulse, a control unit (not illustrated in the figure) that detects the position of the device to which it belongs on a screen on which an image is displayed in accordance with the timing, and a transmission unit 2030 that transmits a signal representing the position; a plurality of image display devices 1000a that include a red light source unit 600R, a green light source unit 600G, and a blue light source unit 600B that emit light pulses to a plurality of areas acquired by dividing the screen into a plurality of parts at a unique timing to each light source; and a control device that includes a reception unit 4200 that receives the signal representing the position from the transmission unit 2030.

As above, although the embodiments of the invention have been described in detail with reference to the drawings, a specific configuration is not limited thereto and includes a design or the like in the scope not departing from the concept of the invention.

For example, in the first and second embodiments, although an LED array is used as the light source unit, the configuration is not limited to the configuration including the LED array as long as it can control the light intensity for each area of the screen. For example, the optical configuration may employ a configuration in which beams transmitted from an LD (Laser Diode) are shaped on a screen by using a hologram device (diffractive optical device). In such a case, the position detecting system can illuminate the screen more uniformly without any waste than a case where a lens optical system is used, while allowing the projection ranges to overlap each other.

In addition, for example, the projection unit 1300 (see FIG. 13) may include an LED array (see FIG. 3).

In addition, it may be configured such that a program used for implementing the position detecting system and the position detecting method described above is recorded on a computer-readable recording medium, and the program is read and executed by a computer system. The "computer system" described here includes an OS and hardware such as peripherals. In addition, the "computer-readable recording medium" represents a portable medium such as a flexible disc, a magneto optical disk, a ROM, or a CD-ROM or a storage device such as a hard disk built in the computer system. Furthermore, the "computer-readable recording medium" includes a medium line that maintains the program for a predetermined time such as an internal volatile memory (RAM) of a computer system that serves as a sever or a client in a case where the program is transmitted through a network such as the Internet or a communication line such as a telephone. In addition, the program may be transmitted from a computer system in which the program is stored in a storage device or the like to another computer system through a transmission medium or through a transmission wave included in the transmission medium. Here, the "transmission medium" that transmits the program represents a medium including a network (communication network) such as the Internet or a communication circuit (communication line)

such as a telephone circuit that has a function of transmitting information. In addition, the program may be used for implementing a part of the above-described function. Furthermore, a so-called differential file (differential program) that can realize the above-described function through a combination with a program that has already been recorded in the computer system may be used.

What is claimed is:

1. A position detecting system comprising:
   a screen divided into an array of sectors;
   a light source that applies a light-pulse pattern on said screen, said light pulse pattern consisting of a start light-pulse simultaneously applied to all of said sectors followed by a timing light-pulse sequential applied to each sector, in turn, at known intervals;
   a pointing device having a photo-sensor and a signal-transmitter, said photo-sensor being pointable at said screen and being effective for detecting the application of light-pulses on said screen by said light source, said signal-transmitter being effective for transmitting a pulse-detection signal in response to said photo-sensor detecting the application of any light-pulse on said screen;
   a reception unit that receives the pulse-detection signals; and
   a control unit in communication with said reception unit and that determines a position on the screen based on a plurality of received pulse-detection signals, said control unit differentiating between a received pulse-detection signal that indicates the detection of an applied start light-pulse and a received pulse-detection signal that indicates the detection of an applied timing light-pulse, wherein the control unit determines a time span from detection of an applied start light-pulse to detection of an applied timing light-pulse, and determination of said position on the screen includes comparing said time span with said known intervals at which said timing light-pulses are applied in said light-pulse pattern.

2. The position detecting system of claim 1, further comprising:
   an image display device that includes the light source; and
   a control device that includes the reception unit and the control unit, said control device being distinct from said image display device.

3. The position detecting system of claim 1, further comprising:
   an image display device housing the reception unit, the light source, and the control unit.

4. The position detecting system of claim 1, wherein;
   said light source is comprised of a plurality of light sub-sources, each individual light sub-source having a one-to-one correspondences with an individual sector of said array of sectors, wherein actuation of an individual light sub-source applies a light-pulse on its corresponding sector;
   each applied light pulse from a respective light sub-source is centered on its corresponding sector, encompasses its corresponding sector, and partly extends into sectors adjacent its corresponding sector;
   the transmitted pulse-detection signal is further indicative of the intensity of the light-pulse detected by the photo-sensor; and
   determination of said position on the screen by the control unit further includes making use of intensity ratios of light pulses applied to said corresponding sector and to sectors adjacent to said corresponding sector.

5. The position detecting system of claim 1, further comprising a plurality of said pointing devices.

6. The position detecting system of claim 1, wherein said light source applies said light-pulse pattern repeatedly to said screen, said screen updates displayed images at regular image-update intervals, said displayed images being distinct from said light-pulse pattern, and a plurality of said light-pulse patterns are repeated within one image-update interval.

7. The position detecting system of claim 1, wherein said light pulse pattern includes a plurality of said start light-pulses in a one-to-one correspondence with said sectors, and in said light pulse pattern, each start light-pulse is individually applied to its respective sector simultaneously, followed by the timing light-pulse being individually and sequential applied to each sector, in turn, at said known intervals.

8. The position detecting system of claim 1, wherein:
   said photo-sensor is pointable at an internal area of a single one of said sectors at a time; and
   said photo-sensor is effective for detecting the application of light-pulses on said screen at the locations to which it is pointed.

9. The position detecting system of claim 8, wherein the transmitted pulse-detection signal is further indicative of a detected intensity of the light-pulse detected by the photo-sensor.

10. The position detecting system of claim 9, wherein said control unit distinguishes between said start light-pulse and said timing light-pulses by their detected intensity.

11. The position detecting system of claim 10, wherein said start light-pulse has a higher detected intensity than the detected intensity of any of the detected timing light-pulses.

12. The position detecting system of claim 1, wherein said light source is comprised of a plurality of light sub-sources, each individual light sub-source having a one-to-one correspondences with an individual sector of said array of sectors, wherein actuation of an individual light sub-source applies a light-pulse on its corresponding sector.

13. The position detecting system of claim 12, wherein:
   each applied light pulse from a respective light sub-source is centered on its corresponding sector, entirely encompasses its corresponding sector, and partly extends into all sectors that abut its corresponding sector;
   the transmitted pulse-detection signal is further indicative of the intensity of the light-pulse detected by the photo-sensor; and
   each sub-source emits light pulses of equal intensity.

14. A position detecting system comprising:
   a screen divided into an array of sectors;
   a light source that applies a light-pulse pattern on said screen, said light pulse pattern consisting of a start light-pulse simultaneously applied to all of said sectors followed by a timing light-pulse sequential applied to each sector, in turn, at known intervals;
   an indicating device having a photo-sensor, a control unit, and a transmission union, wherein:
      said photo-sensor is pointable at said screen and is effective for detecting the application of light-pulses on said screen by said light source;
      a control unit that determines a position on the screen based on a plurality of received pulse-detection signals, said control unit differentiating between a received pulse-detection signal that indicates the detection of an applied start light-pulse and a received pulse-detection signal that indicates the detection of an applied timing light-pulse, wherein the control unit determines a time span from detection of an applied start light-pulse to detection of an applied timing light-pulse, and determination of said position on the screen includes comparing said time span with said known intervals at which said timing light-pulses are applied in said light-pulse pattern; and a transmission unit that transmits a position signal indicative of said position on the screen; and a reception unit that receives the position signal.

15. The position detecting system of claim 14, wherein said light source is housed within a display device, said position detecting system further comprising:

a plurality of said image display devices forming a mosaic over said screen; and a control device that includes the reception unit, said control device being distinct from said plurality of said image display devices.

16. The position detecting system of claim 14, further comprising:

an image display device housing the reception unit and the light source.

17. The position detecting system of claim 14, further comprising a plurality of said indicating devices.

18. A method of detecting a position used in a position detecting system, the method comprising:

dividing a screen into an array of sectors;

applying a light-pulse pattern on said screen, said light pulse pattern consisting of a start light-pulse simultaneously applied to all of said sectors followed by a timing light-pulse sequential applied to each sector, in turn, at known intervals;

providing a pointing device having a photo-sensor and a signal-transmitter; said photo-sensor being pointable at said screen and being effective for detecting the application of light-pulses on said screen by said light source; said signal-transmitter being effective for transmitting a pulse-detection signal in response to said photo-sensor detecting the application of any light-pulse on said screen;

providing a reception unit that receives the pulse-detection signal; and providing a control unit in communication with said reception unit and that determines a position on the screen based on a plurality of received pulse-detection signals, said control unit differentiating between a received pulse-detection signal that indicates the detection of an applied start light-pulse and a received pulse-detection signal that indicates the detection of an applied timing light-pulse, wherein the control unit determines a time span from detection of an applied start light-pulse to detection of an applied timing light-pulse, and determination of said position on the screen includes comparing said time span with said known intervals at which said timing light-pulses are applied in said light-pulse pattern.

* * * * *